United States Patent
Prevost et al.

[11] Patent Number: 5,466,384
[45] Date of Patent: Nov. 14, 1995

[54] DEVICE AND PROCESS FOR CARRYING OUT PHASE SEPARATION BY FILTRATION AND CENTRIFUGATION

[75] Inventors: Isabelle Prevost; Alexandre Rojey, both of Rueil Malmaison, France

[73] Assignee: Institut Francais du Petrole, Rueil Malmaison, France

[21] Appl. No.: 147,542

[22] Filed: Nov. 5, 1993

[30] Foreign Application Priority Data

Nov. 5, 1992 [FR] France .................................. 92 13359

[51] Int. Cl.$^6$ ....................................................... B01D 21/20
[52] U.S. Cl. ............................ 210/787; 55/456; 209/715; 209/716; 209/725; 209/734; 210/512.3; 210/413; 210/414; 210/415
[58] Field of Search ..................................... 210/767, 780, 210/512.1, 512.3, 787, 413, 414, 415; 55/456; 209/713, 716, 725, 734

[56] References Cited

U.S. PATENT DOCUMENTS

| | | | |
|---|---|---|---|
| 2,970,669 | 7/1961 | Bergson | 55/456 |
| 3,648,754 | 3/1972 | Sephton. | |
| 3,938,434 | 2/1976 | Cox | 210/415 |
| 4,214,377 | 7/1980 | Maffet | 210/767 |
| 4,678,588 | 7/1987 | Shortt | 210/512.1 |
| 4,966,703 | 10/1990 | Kalinis et al. | 210/512.1 |
| 5,252,229 | 10/1993 | Rojey et al. | 210/512.1 |

OTHER PUBLICATIONS

Patent Abstracts of Japan, vol. 12, No. 297 Mar. 1988.
Patent Abstracts of Japan, vol. 2, No. 136 Jun. 1978.

*Primary Examiner*—Robert A. Dawson
*Assistant Examiner*—David Reifsnyder
*Attorney, Agent, or Firm*—Antonelli, Terry, Stout & Kraus

[57] ABSTRACT

A device for separating a mixture comprised of at least a continuous phase I and at least a disperse phase II, one of the phases being a light phase and the other being a heavy phase, comprising canalization means for canalizing a current of the mixture and suited for communicating thereto a helical motion along a central shaft (A) and filtration means, the motion leading to a differentiated radial displacement of the light phase and of the heavy phase under the action of the centrifugal force, during which the continuous phase I flows at least partly through said filtration means. The canalization means and filtration means are arranged to define a helical passage which decreases according to a direction of flow of the mixture through the device.

15 Claims, 3 Drawing Sheets

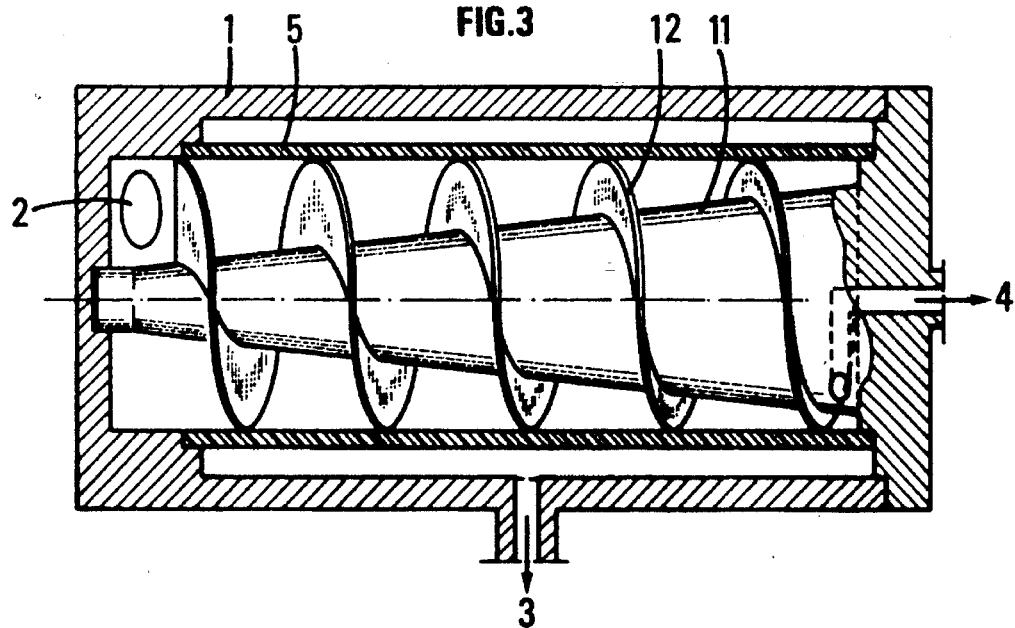
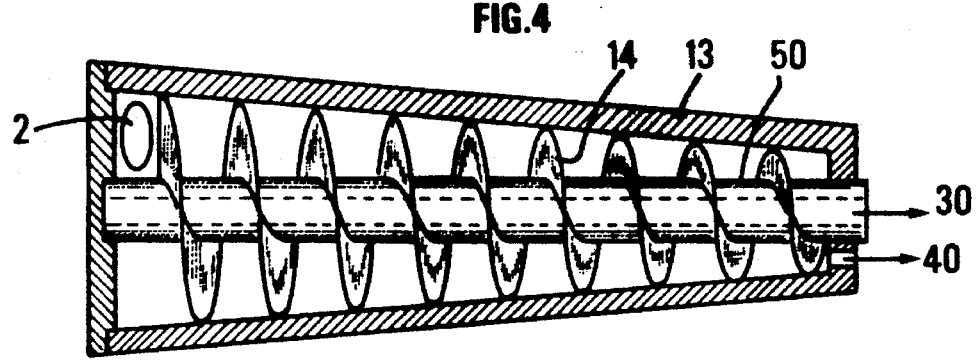
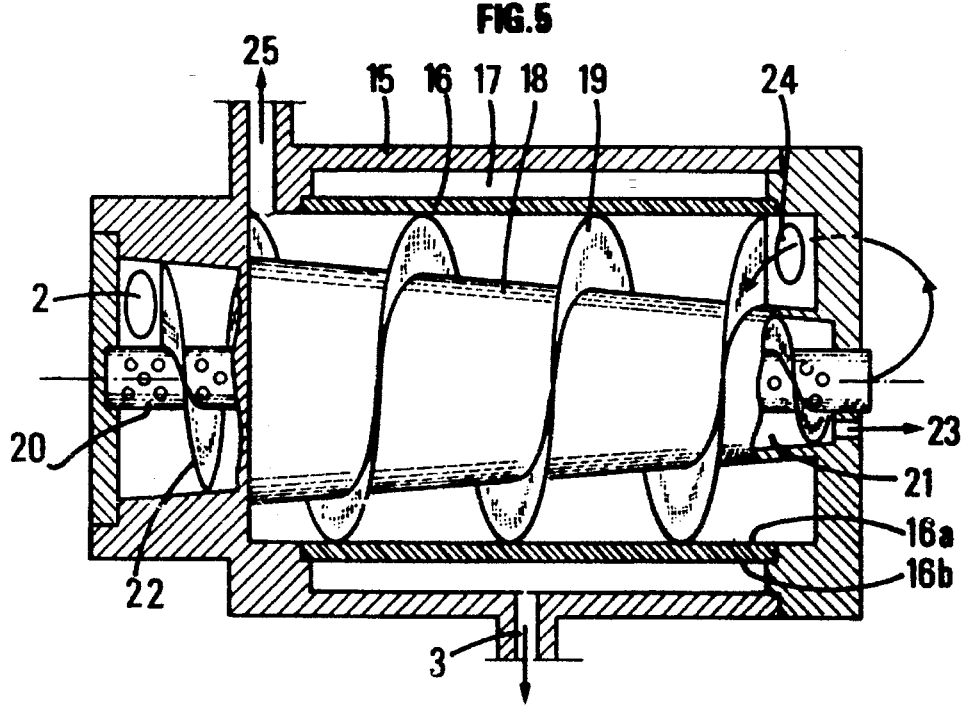

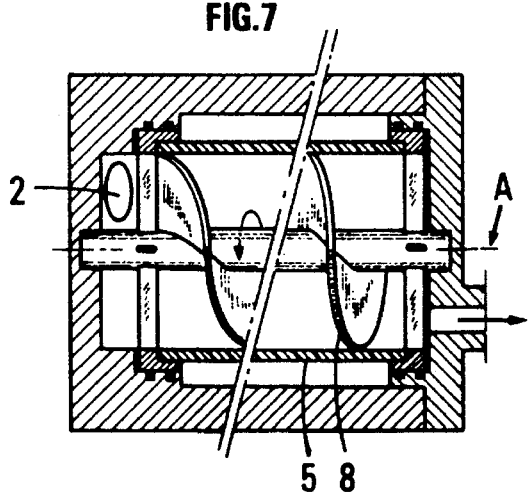
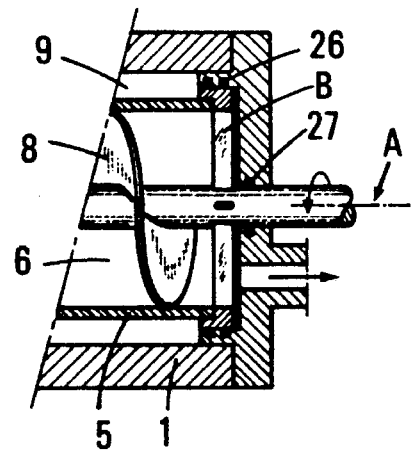
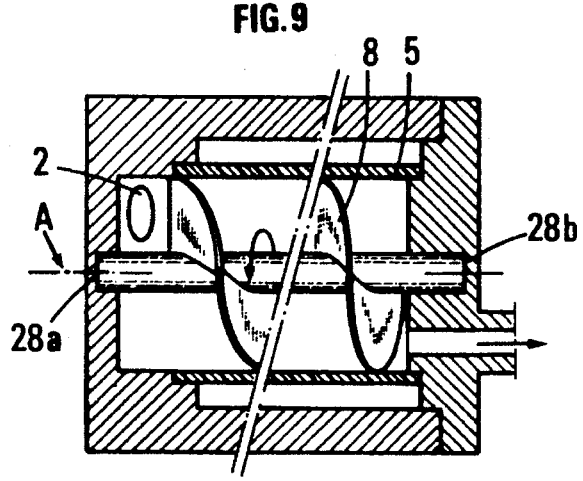
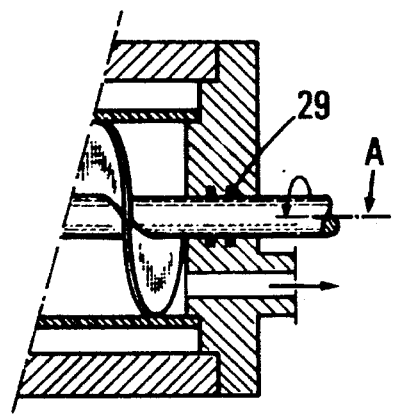
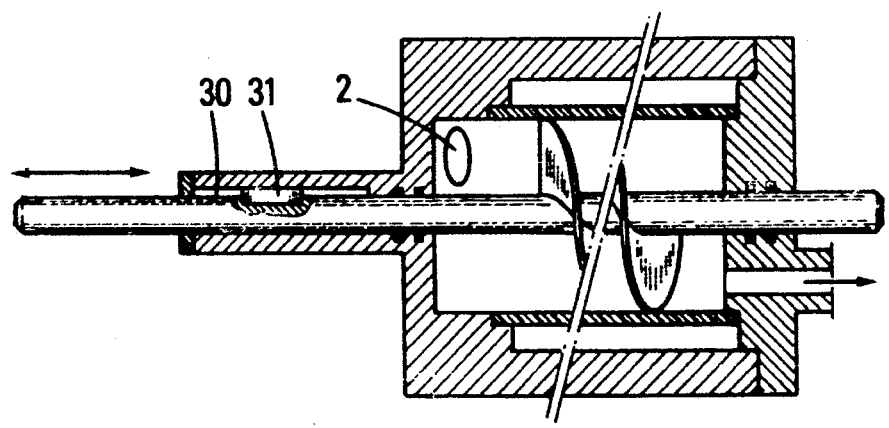

DEVICE AND PROCESS FOR CARRYING OUT PHASE SEPARATION BY FILTRATION AND CENTRIFUGATION

BACKGROUND OF THE INVENTION

The present invention relates to a device and to a process allowing separation or filtration of a continuous phase containing a disperse phase.

Separation processes utilizing filtration techniques are widespread in the food, pharmaceutic, biomedical and water conditioning industries. Such a separation takes account of the size of the disperse phase particles and allows a high-level separation of the phases. One significant field of application relates to the separation of two liquid phases in emulsion.

However, the development of this type of process is checked and its extension to other industry types, such as the petroleum industry, is limited because of maintenance and processing capacity problems. In fact, at the time of the separation, two phenomena reduce the flux flowing through the separation membrane : the concentration polarization, which is expressed by a reversible formation of a disperse phase layer in the vicinity of the membrane surface, and the clogging of the membrane, which may be partly irreversible and results from an obstruction of the pores. These two phenomena cause a clogging of the membrane, which leads to a decrease in the flux flowing through the membrane and therefore to a decrease in the processing capacity of the separation units.

In the description hereafter, what is understood to be the permeate is the fraction of the mixture flowing through a filtering wall and the terms "retentate" or "concentrate" correspond to the fraction which is stopped by the filtering wall. Similarly, what is understood to be a "filtering wall" or "filtration wall" is a porous wall allowing selective filtration and a "solid wall" is a wall made of a homogenous material impervious to the fluids considered.

What is understood to be a "membrane" is a filtering wall comprised, at the surface, of a microporous selective layer and which may be arranged on a macroporous support and/or a grid providing mechanical resistance.

The prior art describes several types of devices designed for limiting the clogging of separation membranes.

Thus, one of the first efforts to improve the existing devices focuses on the structure of the membranes whose pore size is markedly smaller than the size of the particles or of the droplets to be retained in the concentrate and which, if the disperse phase is liquid, are selected so as not to wet the disperse phase. Other improvements proposed consist in achieving separation devices including periodic back pressure and pinpoint chemical washing systems allowing the particles amalgamated on the membrane surface to be drawn away.

Another way of reducing the disperse phase accumulation next to the wall consists in increasing the shear or the turbulence on the membrane surface, for example by carrying out a tangential filtration instead of a frontal filtration. The tangential shear may also be increased by raising the circulation rate of the mixture; this procedure is however disadvantageous in that it reduces the mean residence time of the mixture in the device and consequently the permeate flow rate. This drawback is remedied by recirculating part of the concentrate, which leads to a cost increase.

U.S. Pat. Nos. 1,604,241 and 521,902 describe tangential filtration devices for which the shear on the wall is increased by a helical flow of the mixture passing through several channels. Using several parallel channels is nevertheless disadvantageous in that it decreases the linear circulation rate of the mixture, for the same rate of flow, which leads to a decrease in the shear on the wall and to an increase in the disperse phase accumulation next to the wall.

In patent J-53,102,282, the action of the centrifugal force on a powder admixed with the concentrate is used to clean mechanically and continuously the membrane surface. This process requires an additional stage for separating the powder from the retentate.

U.S. Pat. Nos. 1,800,074 and 2,240,121 relate to dynamic filtration devices in which the membrane surface is brought into rotation or vibration so as to detach the particles caked on the membrane. The drawback of these devices is to implement mechanical parts in motion while having a limited efficiency.

SUMMARY OF THE INVENTION

The object of the present invention is to remedy the drawbacks cited above by providing a device whose basic principle allows a static type filtration to be achieved through a process which is more efficient than those known in the prior art and which calls for no particular conditions concerning the properties required for the mixture to be treated.

The present invention relates to a device for separating a mixture comprised of at least a continuous phase I and at least a disperse phase II, one of the phases being called a light phase, and the other phase being called a heavy phase, comprising means for canalizing a current of the mixture and suited for communicating thereto a helical motion along a central shaft, and filtration means, the motion leading to a differentiated radial displacement of the light phase and of the heavy phase under the action of the centrifugal force during which the continuous phase I flows at least partly through said filtration means, the device being characterized in that the canalization means and the filtration means are arranged so as to define a helical passage which decreases according to the direction of flow of the mixture.

The canalization means comprise, for example, at least a solid wall and at least a helical-shaped inner part, and the filtration means comprise at least a filtering wall, said solid wall and said filtering wall displaying both a rotational symmetry around the central shaft, and the helical part being for example located between the solid wall and the filtering wall.

When the continuous phase is the phase called the heavy phase, the filtering wall is arranged towards the outside of the helical inner part and the solid wall is arranged towards the inside, said solid wall consisting for example of the shaft of said helical inner part.

When the continuous phase is the phase called the light phase, the filtering wall is arranged towards the inside of the helical-shaped inner part and the solid wall is arranged towards the outside.

The progressive reduction in the section of the helical passage may for example be obtained by reducing the pitch of the helical part.

The decrease in the passage section may also be obtained through a progressive variation of the cross-section of the solid wall.

The device may also be suited for carrying out a double separation of a mixture. In this case, the canalization means comprise for example a truncated-cone-shaped solid wall and a cylindric outer solid wall, said walls being coaxial and said filtration means comprising a first filtering wall, consisting of a grid located inside the truncated-cone-shaped solid wall and of a second filtering wall located outside the truncated-cone-shaped solid wall and inside the cylindric solid wall.

The helical part and the filtering wall may be interconnected and free in rotation.

The device may include means for bringing the helical inner part into rotation with respect to the filtering wall, and mechanical means favouring the declogging of the filtering wall such as wipers or scrapers.

The filtering wall may be made of a material preferably wettable by the continuous phase.

The filtering wall may be a membrane whose pore diameter ranges for example between 0.01 and 10 microns.

The present invention further relates to a process for separating a mixture comprising at least a continuous phase I and at least a disperse phase II, at least one of the phases being a phase called a heavy phase and the other being called a light phase. It is characterized in that the mixture is flowed into a helical passage formed by at least a solid wall, a filtering wall and a helical-shaped part, and in that the flow of said phases I and II along said passage causes a rotational motion leading to a differentiated displacement of the light phase and of the heavy phase during which the continuous phase I flows at least partly through the filtering wall.

The mixture may be led into a helical passage whose section of flow decreases according to the direction of flow of the mixture.

The velocity of the mixture therefore remains sufficiently high during the separation.

The process and the device may be advantageously used for separating a mixture consisting of two liquid phases.

It may also be applied to a mixture made up of an aqueous liquid phase and at least an organic liquid phase.

The mixture may also comprise a disperse phase composed of a gas phase, or at least a solid phase.

The process according to the invention may also allow separation of a mixture in which the continuous phase comprises a gas phase.

The relative lay-out of the elements of the present invention allows:

- a reduction in the polarization and/or in the clogging of the filtering wall or membrane due to the presence of a centrifugal force whose direction is perpendicular to the wall and opposite the direction of flow of the permeate through the membrane;
- a high and constant circulation rate of the retentate on the total filtering wall through the variation of the section of flow;
- if need be, the possibility of carrying out a continuous mechanical declogging of the filtering wall by scraping or sweeping.

BRIEF DESCRIPTION OF THE DRAWINGS

Other features and advantages of the present invention will be clear from reading the description hereafter, with reference to the accompanying drawings in which:

FIGS. 3, 4 and 5 show a variant of the device of FIGS. 1, 2 in which the helical surface has a constant spiral pitch and the solid surface has a variable section;

FIGS. 6 to 8 show an embodiment example of the invention where the whole of the filtration membrane, of the solid surface and of the helical surface is brought into rotation; and FIGS. 9 to 11 show an embodiment of a device according to the invention where the helical part is brought into a relative motion with respect to the membrane.

DESCRIPTION OF THE PREFERRED EMBODIMENTS

The device which will be described hereafter allows separation of a mixture comprising a continuous phase I and a disperse phase II by driving it through a filtration wall such as a membrane, one of the phases being called the light phase and the other phase being called the heavy phase, and it is so designed that the mixture to be separated or filtered is brought into rotation and that the centrifugal force generated thereby leads to a differentiated motion of the light phase and of the heavy phase, and the continuous phase flows at least partly through the filtering wall.

Figure 1:
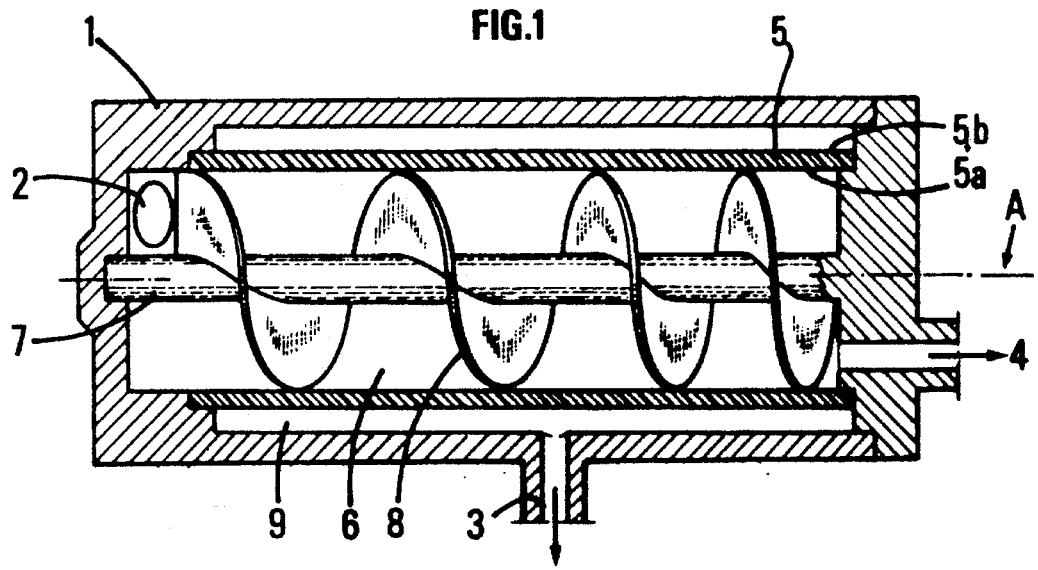
FIGS. 1, 2 show a filtering device with no parts in motion, for which the helical surface has a variable spiral pitch.

The device of FIG. 1 is suited to the separation of a mixture in which the disperse phase II is the lighter phase, the continuous phase I being the heavier phase. It comprises a substantially cylindric chamber 1 in which is arranged a coaxial and substantially cylindric filtration wall 5 such as a membrane, delimited by two inner 5a and outer 5b surfaces, mixture delivery lines 2 and discharge lines 3, 4 for discharging respectively the permeate and the retentate of the mixture to be separated.

A coaxial inner part 7 forming a shaft A secured with chamber 1 and a helical part 8 secured with part 7 are arranged in the annular space 6 formed by inner surface 5a.

The outer surface 5b and the inner face of chamber 1 delimit an annular space 9 in which the permeate is collected before it is discharged through discharge line 3.

The retentate is collected in annular space 6 and discharged through line 4.

One possibility of use of the device consists in introducing the mixture to be separated, comprising the continuous phase I and the disperse phase II, through line 2. The mixture is guided in rotation as a result of its flowing along helical part 8. Because of the rotational motion generated thereby, the light phase particles remain closer to shaft A, which prevents clogging of the membrane pores, whereas the heavier continuous phase flows through the membrane. As it progresses in the device, the mixture comprising the two phases I and II grows poorer in continuous phase I, the permeate flowing through membrane 5 to be collected in space 9 and discharged through line 3, whereas the concentration of the disperse phase in the remaining mixture increases as it flows along the helical part and the annular space 6 before it is discharged through line 4 (retentate).

The circulation of the mixture in a helical motion allows the concentration polarization and/or the clogging of the membrane to be reduced, on the one hand through a shear effect and on the other hand through a centrifugal effect which tends to drive the disperse phase into a direction other than that of the transmembrane flow of the permeate.

In order to allow these two effects to be exerted fully throughout the flow, it is necessary to maintain all along a constant or at least a sufficient circulation rate. If the helical section of flow remains constant, the circulation rate decreases as a result of the progressive decrease in the rate of flow of the mixture related to the flow of the permeate through the membrane.

A helical part 8 whose pitch and consequently whose section of flow are progressively reduced is therefore preferably used.

The reduction in the pitch p(i) of the coil i of a helical part made up of n coils is preferably selected equal to:

$$p(i) = p(o) * \left(1 - \frac{P(i)}{Q(o)}\right)$$

with:

p(o)=pitch of the first coil considered (in m)
p(i)=pitch of coil i
Q(o)=inflow rate (in m$^3$/h)
Q(i)=flow of concentrate flowing from coil i $$P(i) = \sum_{j=o}^{i} Q(i-1) - Q(i)$$

flow of permeate collected by the first i coils (in m$^3$/h).

If the flux F (in m$^3$/m$^2$/ h) of permeate may be considered as constant on the whole of the coils, L being the circumference of the membrane, this relation may be expressed as follows:

$$p(i) = \frac{p(o)}{\left(\frac{p(o)*F*L}{Q(o)} + 1\right)^i}$$

As the retentate concentrates in disperse phase, the filtering wall is more likely to clog. In order to avoid a flux decrease in this zone, it is possible to reduce the pitch of the corresponding coils and thereafter to increase locally the circulation rate of the permeate and the shear on the wall.

Such a device is notably applied to the separation of an emulsion made up of two liquid phases, the lighter phase forming the disperse phase. It is for example applied to the separation of an oil-in-water emulsion. The oil then forms the disperse phase II and the water forms the continuous phase I.

Figure 2:
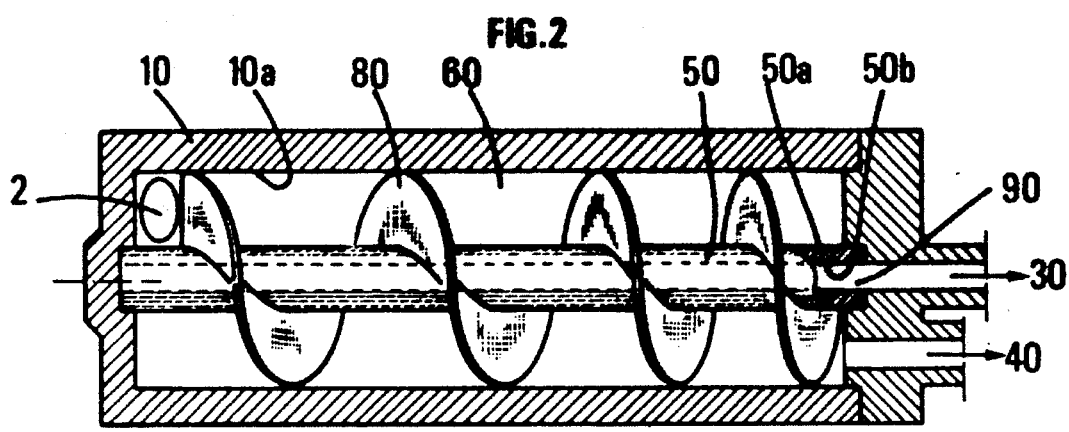

FIG. 2 shows a variant of the device according to the invention adapted for separating a mixture in which the disperse phase II is the heavier phase, the continuous phase I being the lighter phase.

The device comprises a substantially cylindric chamber 10 provided with a mixture delivery line 2 and discharge lines 30, 40 for discharging respectively the permeate and the retentate of the mixture to be separated, in which a tubular coaxial membrane 50 having an outer surface 50a and an inner surface 50b are arranged.

The outer surface 50a of membrane 50 and the inner surface 10A of chamber 10 delimit an annular space 60 in which a helical part 80 is arranged.

The inner surface 50b delimits a central space 90 in which the permeate is collected before it is discharged through line 30.

The process according to the invention may be implemented as follows: the mixture consisting of the disperse phase and the continuous phase to be separated is introduced into chamber 10 through delivery line 2. The mixture is guided in rotation as a result of its flowing along the helical part 80 and the heavy phase particles subjected to a centrifugal force as a result of the rotational motion generated thereby move away from the membrane, which prevents the progressive clogging of the membrane pores while the light continuous phase flows through the membrane. As it progresses in the device, the mixture comprising the two phases grows poorer in continuous phase I which flows through the membrane and is collected in the central space 90 and discharged through line 30, whereas the remainder of the mixture concentrates in disperse phase as it flows along the helical part and it is eventually discharged through line 40.

As it was the case for the device described in FIG. 1, the two shear and centrifugation effects are optimized by using a helical part 80 whose pitch is progressively reduced, which allows the circulation rate to be maintained at a constant value.

Such a device is particularly applied to the separation of an emulsion made up of two liquid phases, the heavier phase forming the disperse phase. It is for example applied to the separation of a water-in-oil emulsion. The oil then forms the continuous phase I and the water forms the disperse phase II.

The line 2 for delivering the mixture to be separated into chamber 1, 10 is preferably located at one end of the chamber and the line 4, 40 for discharging the retentate is located at the opposite end.

Another way of maintaining a constant circulation rate of the mixture while it flows along the helical inner part outfitting the separation device is described in connection with the embodiment examples shown in FIGS. 3, 4, 5. The reduction in the helical section of flow is obtained in this case by a progressive reduction in the deviation between the outside and the inside diameter of the helical section of flow.

The device schematized in FIG. 3 is more particularly adapted to the separation of a mixture comprising a relatively light disperse phase and a continuous phase which is the heavier phase. It further includes a cylindric chamber 1, a filtering membrane 5, also cylindric, and inside the membrane, a truncated-cone-shaped part 11 whose base is located at the end of the chamber opposite the mixture delivery line 2, a helical part 12 with a constant helical pitch whose outside diameter is substantially equal to that of the filtration wall, arranged between the truncated-cone-shaped part 11 and the filtration wall.

A retentate discharge line 4 preferably crosses the base of cone 11 in its central part and opens into a zone of flow contained between the truncated-cone-shaped part and the filtration wall.

When the mixture comprising the two phases to be separated is introduced, the light phase droplets are gathered around part 11, the circulation rate of the mixture remaining substantially constant and sufficiently high throughout the separation process on account of the conical shape of the central part 11.

The device of FIG. 4 is a variant of the device shown in FIG. 3, adapted for the separation of a mixture in which the disperse phase is the heavier phase and the continuous phase is the lighter phase.

The reduction in the helical section of flow is provided in this case by a hollow part 13 acting as a chamber, whose inner section decreases progressively from a first end into which delivery line 2 opens towards its opposite end. As in the embodiment of FIG. 2, membrane 50 is arranged according to the axis of the chamber. A helical part 14 whose pitch is for example substantially constant along the circulation line is also located between the membrane and chamber 13.

The outer section of this part is adapted to that of chamber 13 and therefore decreases progressively according to the direction of flow of the mixture to be separated.

The inner section of chamber 13 is preferably truncated-cone-shaped, the retentate discharge line 40 and the permeate discharge line 30 being arranged at the level of the smallest cross-section which therefore forms the discharge section.

FIG. 5 shows a particular embodiment of the invention with two filtration stages adapted more particularly to the separation of a mixture comprising three phases for which the disperse phases II and III are respectively heavier and lighter than the continuous phase I.

This embodiment is particularly suited for separating oily water charged with solid particles.

In this case, the device results from the combination of the devices described in FIGS. 3 and 4, and it comprises two successive filtration stages. The device includes a cylindric chamber 15 in which is arranged a coaxial membrane 16 whose inner surface 16a is preferably wettable by the aqueous phase of the mixture to be separated.

The outer surface 16b of membrane 16 and the inner surface of chamber 15 delimit an annular space 17 in which the permeate is collected and thereafter discharged through a radial line 3.

A truncated-cone-shaped part 18 is arranged in the space of chamber 15 interior to membrane 16. The section of this part 18 decreases from a first end of chamber 15 to its opposite end. A helical part 19 whose spiral pitch is preferably constant and whose outer section is adapted to the inner section of membrane 16 is arranged between membrane 16 and part 18.

A perforated tube 20 consisting for example of a grid is arranged inside solid part 18 according to its axis.

The inner surface of truncated-cone-shaped part 18 and the outer surface of perforated tube 20 delimit an annular space 21 in which a helical part 22, preferably arranged coaxially and having a constant pitch, is located. The outer section of this helical part 22 is adapted to the decreasing section of the annular space 21.

The mixture comprising the various phases to be separated is introduced into part 18 through a line 2 and guided in rotation as a result of its flowing along the helical surface 22. The solid particles gather under the effect of the centrifugal force along the solid part 18 and are eventually discharged through a line 23 located, for example, at the second end of the chamber. They remain therefore away from grid 20, which prevents a progressive clogging thereof. The liquid phases, which are lighter, flow through grid 20 and are re-introduced tangentially through a line 24 into the second filtration section, called a secondary filtration section, defined by the helical part 19, membrane 16 and part 18. The lightest liquid drops, little affected by the centrifugal force, remain close to the solid surface 18, preventing thereby a polarization and/or a progressive clogging of the pores of membrane 16. On the other hand, the heavier liquid phase flows through membrane 16 and is discharged through line 3. The purpose of part 18 is more particularly to keep the circulation rate of the mixture to be separated constant while it flows along the shaft of the device. Consequently, the shear on the wall remains high on the whole of the membrane surface. The concentrate is discharged through line 25 and the permeate is discharged through line 3.

The devices shown in FIGS. 1 to 6 are characterized in that they comprise no part in motion. The centrifugal force exerted on the mixture is due to the circulation of the mixture driven in rotation along the helical part. The tangential velocity of the fluid cancels out in contact with the motionless filtering wall. In this part of the fluid, the centrifugal force is negligible and the shear is appreciable.

The embodiments of FIGS. 6 and 7 obtained by modifying the device of FIG. 3 comprise a means for decreasing the shear on the wall and for reducing pressure drops, while preventing the formation of a polarization layer of the membrane.

The embodiment of FIG. 6 is obtained by making membrane 5, helical part 8 and shaft A integral and free in rotation with respect to chamber 1. Shaft A may be driven in rotation by a motor and it communicates its rotational motion to membrane 5. Shaft A is connected to membrane 5 by fastening means such as arms B located in the vicinity of the two ends of chamber 1. The annular space 6 for collecting the concentrate and the annular space 9 for collecting the permeate are insulated from each other by at least one close joint 26. Sealing at the outlet of shaft A is provided by a close joint 27. The direction of rotation of shaft A is preferably identical to the direction of circulation of the mixture in the helical part 8.

The light phase particles deposited on the membrane gain angular speed and are subjected to a centrifugal force perpendicular to the membrane in the opposite direction with respect to that of the transmembrane flow of the permeate. Generally, all the disperse phase particles have a tangential velocity due to their displacement in the helical part, increased by the value of the rotating speed of shaft A, and they are therefore subjected to a higher centrifugal acceleration than in the case of a static device.

Figure 8:
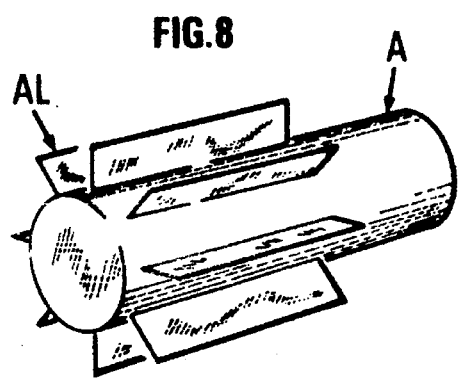

The same principle may be implemented by letting shaft A, membrane 5 and helical Dart 8 rotate freely under the effect of the mixture circulation. The advantage of this alternative, illustrated in FIG. 7, is that is uses no external mechanical driving means. In case of a low flow rate or of appreciable frictions, shaft A is for example provided with longitudinal fins AL (FIG. 8).

The embodiments shown in FIGS. 9 to 12 are mainly characterized in that the helical part 8 and the membrane 5 are driven by a relative motion.

Shaft A (FIG. 9), secured with the helical part 8, is guided in rotation by housings 28a and 28b also providing centering. Rotation may be improved by using bearings. In this embodiment, the solid part 7 and part 8 are driven into free rotation under the effect of the mixture flow (FIG. 9).

External mechanical driving means (not shown) may also be used (FIG. 10) for driving shaft A into rotation. In this case, the rotating speed of shaft A is selected as a function of the desired sweep frequency of the peripheral portion of helical part 8 on the inner surface 5B of membrane 5. Joints 29 form a seal at the outlet of shaft A. The direction of rotation of shaft A, shown by the arrow in the figure, is determined by the pumping conditions of the mixture to be separated. The contact between the periphery of the helical part 8 and membrane 5 is relatively close to prevent leakage of the mixture comprising the two phases I and II between adjacent coils. Declogging of the membrane is thus achieved continuously through the axial displacement of the end of the helical part which sweeps the surface in contact therewith.

In order to improve the declogging of the membrane, the helical part is for example provided, on its periphery, with mechanical means such as wipers or scrapers allowing declogging of the membrane to be improved.

According to the embodiment of FIG. 11, a reciprocating translation motion may also be communicated to the solid part 7 corresponding to shaft A. In this case, the device comprises a groove 30 in which a key 31 slides, the key acting thus as a thrust. This alternative allows a manual or automatic pinpoint declogging of the membrane.

The previous lay-outs allow the mechanical declogging of the motionless membrane through the axial displacement of the peripheral portion of helical part 8 on the membrane and the destabilization of the polarization layer to be achieved.

Membrane characteristics such as wettability, thickness, pore size, composition, are well-known by the man skilled in the art and are selected according to the mixture comprising the two phases to be separated. Membranes 5, 50 are therefore preferably not wettable by the disperse phase in case of filtration of immiscible liquids. According to the grain size of the disperse phase, the pore size of the membrane ranges for example between 0.01 and 10 microns and may be very close to the size of the particles without risking a progressive clogging of the membrane. This pore size is more particularly suited to the separation of an emulsion. It is also possible, without departing from the scope of the invention, to use membranes whose pore size ranges for example between 0.001 and 0.01 micron to separate finer particles. The membrane may have an asymmetric structure comprising a homogenous and very fine 0.1 to 0.5-inch thick skin and a 100 to 200-micron thick underlayer of a much more porous texture, deposited on a macroporous support providing a high mechanical strength. The membrane may be made of a synthetic polymer material such as polysulfone, polyacrylonitrile, polyamide, or of a mineral material formed for example by sintering carbon, aluminum oxide or zirconium dioxide particles.

In all the embodiments described above, the mixture delivery line 2 is preferably arranged tangentially to the circular section of the chamber in which the mixture is introduced. This favours the rotating motion of the mixture around the shaft of the device.

Without departing from the scope of the invention, the number of helical passages may be multiplied, for example by arranging a plurality of coaxial helical parts with a constant or variable pitch.

Without departing from the scope of the invention, the helical inner part may be devoid of a central shaft.

Without departing from the scope of the invention, any number of devices according to the invention may be associated. It is for example possible to associate them in parallel, the flow of mixture processed being distributed between the various devices, or in series, the retentate flowing out of a device being driven into another device to be subjected to a complementary treatment.

Of course, the process and the device which have been described by way of non limitative examples may be provided with various modifications and/or additions by the man skilled in the art without departing from the scope of the invention.

We claim:

1. A device for separating a mixture comprised of at least a continuous phase I and at least a disperse phase II, one of the continuous and disperse phases being a light phase and the other phase being a heavy phase, comprising a filtration means, canalization means for canalizing a flow of the mixture and for communicating thereto a helical motion along a central shaft and the filtration means, the helical motion causing a differential radial displacement of the light phase and of the heavy phase under the action of centrifugal force during which the continuous phase I flows at least partly through said filtration means; the canalization means and the filtration means being arranged to define a helical passage decreasing in a direction of the flow of the mixture; the canalization means comprising a solid wall and a helical-shaped inner part, the filtration means comprising a filtering wall, said solid wall and said filtering wall both having a rotational symmetry around the central shaft, and said helical part being located between said solid wall and said filtering wall; said filtering wall consisting of a membrane.

2. A device as claimed in claim 1, wherein said continuous phase is the heavy phase, the filtering wall is arranged outside of said helical inner part and the solid wall is arranged inside of the helical part, said solid wall comprises a shaft of said helical inner part.

3. A device as claimed in claim 1, wherein a progressive reduction in a section of the helical passage is obtained through a reduction in pitch of the helical part.

4. A device as claimed in claim 1, wherein a cross-section of the solid wall varies progressively to provide a helical passage of decreasing section.

5. A device as claimed in claim 1, wherein the canalization means comprise a solid truncated-cone-shaped wall and a cylindric outer solid wall, said walls being coaxial and said filtration means comprising a first filtering wall consisting of a grid located inside the solid truncated-cone-shaped wall and a second filtering wall located outside the solid truncated-cone-shaped wall and inside the cylindric solid wall.

6. A device as claimed in claim 1, wherein the helical part and the filtering wall are interconnected and free to rotate from the flow of the mixture.

7. A device as claimed in claim 1, further comprising means for bringing the inner helical part into rotation with respect to the filtering wall and mechanical means for declogging the filtering wall, which includes wipers for cleaning the filtering wall.

8. A device as claimed in claim 1, wherein the filtering wall consists of a material wettable by the continuous phase.

9. A device as claimed in claim 1, wherein the membrane has pores whose diameter ranges between 0.01 and 10 microns.

10. A device for separating a mixture comprised of at least a continuous phase I and at least a disperse phase II, one of the continuous and disperse phases being a light phase and the other phase being a heavy phase, comprising a filtration means, canalization means for canalizing a flow of the mixture and for communicating thereto a helical motion along a central shaft and the filtration means, the helical motion causing a differential radial displacement of the light phase and of the heavy phase under the action of centrifugal force during which the continuous phase I flows at least partly through said filtration means; the canalization means and the filtration means being arranged to define a helical passage decreasing in a direction of the flow of the mixture; the canalization means comprising a solid wall and a helical-shaped inner part, the filtration means comprising a filtering wall, said solid wall and said filtering wall both having a rotational symmetry around the central shaft, and said helical part being located between said solid wall and said filtering wall; the continuous phase being the light phase, the filtering wall being arranged towards the inside of said helical inner part and the solid wall being arranged outside of the helical inner part.

11. A process for separating a mixture comprised of at least a continuous phase I and at least a disperse phase II, at least one of the continuous and disperse phases being a heavy phase and the other being a light phase, which comprises introducing the mixture into a helical passage formed by at least a solid wall, a filtering wall consisting of a membrane and a helical-shaped part, so that the flow of said phases I and II along said passage causes a rotational motion leading to a differential displacement of the light phase and of the heavy phase and the continuous phase I flows at least partly through the filtering wall; said helical passage having a section of flow that decreases in a direction of the flow of the mixture.

12. A process of using the device as claimed in claim 11, wherein the mixture is made up of an aqueous liquid phase and at least an organic liquid phase.

13. A process according to claim 11, wherein the disperse phase is comprised of a gas phase.

14. A process according to claim 11, wherein the disperse phase is comprised of a solid phase.

15. A process according to claim 11, wherein the continuous phase I is comprised of a gas phase.

* * * * *